(12) United States Patent
Lammens, Jr. et al.

(10) Patent No.: US 7,427,714 B1
(45) Date of Patent: Sep. 23, 2008

(54) CONDUIT JUNCTION BOX REPLACEMENT COVER

(76) Inventors: Albert James Lammens, Jr., 758 N. Glendora Ave., Covina, CA (US) 91724; Randy Lamar Marx, 6161 Candlewood Ct., Las Vegas, NV (US) 89108

( * ) Notice: Subject to any disclaimer, the term of this patent is extended or adjusted under 35 U.S.C. 154(b) by 225 days.

(21) Appl. No.: 11/126,076

(22) Filed: May 10, 2005

Related U.S. Application Data

(60) Provisional application No. 60/569,961, filed on May 11, 2004.

(51) Int. Cl.
*H05K 5/03* (2006.01)
(52) U.S. Cl. .................. 174/66; 174/67; 174/53; 174/57; 220/241; 220/242; 220/3.2
(58) Field of Classification Search .............. 174/48, 174/49, 50, 53, 58, 57, 66, 67, 68.1, 68.3, 174/480, 481; 220/3.2–3.9, 4.02, 241, 242; 248/906; 439/535; D13/152
See application file for complete search history.

(56) References Cited

U.S. PATENT DOCUMENTS

| | | | | |
|---|---|---|---|---|
| 609,356 A * | 8/1898 | Bissell | .................. | 220/3.8 |
| 642,521 A * | 1/1900 | Greenfield | .................. | 220/3.8 |
| 2,148,872 A * | 2/1939 | Nicholas | .................. | 174/53 |
| 2,398,782 A * | 4/1946 | Gent et al. | .................. | 220/3.2 |
| 3,430,799 A * | 3/1969 | Maier | .................. | 220/3.94 |
| 4,896,784 A * | 1/1990 | Heath | .................. | 220/3.2 |
| 5,169,013 A * | 12/1992 | Lammens, Jr. | .................. | 220/3.2 |
| 5,360,130 A * | 11/1994 | Lehmann et al. | .................. | 220/3.8 |
| 5,621,189 A * | 4/1997 | Dodds | .................. | 174/50 |
| 6,677,519 B2 * | 1/2004 | Rumsey et al. | .................. | 174/50 |
| 6,733,345 B2 * | 5/2004 | Weise et al. | .................. | 174/50 |
| 6,831,222 B2 * | 12/2004 | Pastuch | .................. | 174/58 |

* cited by examiner

*Primary Examiner*—Angel R Estrada
(74) *Attorney, Agent, or Firm*—Jeffer Mangels Butler & Marmaro, LLP

(57) ABSTRACT

A conduit junction box replacement cover for electrical conduit junction boxes. The replacement cover can replace a conventionally designed cover on a conduit junction box that contains corroded or otherwise damaged threaded holes rendering the installation of a conventionally designed junction box cover difficult or costly. The removable replacement cover has a flat inside surface and a rim that overlaps the outer walls of the body of the junction box. The removable replacement cover can be installed by inserting set screws through the rim to make secure contact with the body of the junction box. A flat gasket on the inside surface of the replacement cover and positioned within the rim seals the junction box from adverse environmental conditions. The rim of the replacement cover can contain several cut-outs to permit the installation of the replacement cover on conduit junction boxes that contain one or more external hubs.

18 Claims, 4 Drawing Sheets

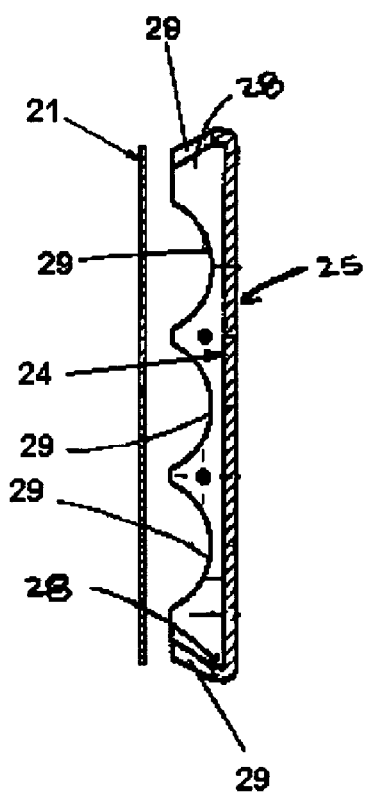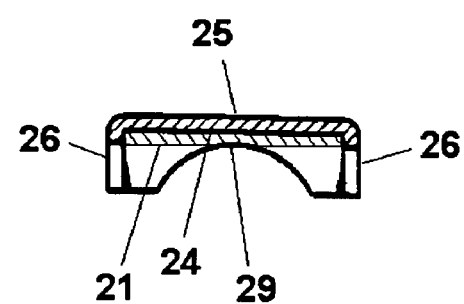
FIGURE 3
FIGURE 4

CONDUIT JUNCTION BOX REPLACEMENT COVER

CROSS-REFERENCE TO RELATED APPLICATIONS

This application claims the benefit of U.S. Provisional Patent Application Ser. No. 60/569,961, filed May 11, 2004.

BACKGROUND OF THE INVENTION

The field of the invention is electrical junction boxes and conduit junction boxes. Most building codes require electrical wiring to be enclosed in electrical conduit which are coupled to one another by electrical junction boxes. A typical junction box has a hollow body with at least one open side. A junction box has conduit coupling hubs extending through the walls of the box and an interior space that is accessible through the open sides of the box. Wires extend through the conduit into the junction boxes where they are commonly spliced or joined. The open sides of the junction box are then closed with removable covers that are attached to the body of the junction box with screws. Examples of prior electrical conduit systems and junction boxes are described in U.S. Pat. Nos. 1,741,358; 2,208,558; 2,398,782 and 5,169,013.

A common shape for a conduit box is one with a generally oblong body, one open longitudinal side, curved ends and conduit coupling hubs at various locations on the body. Conduit boxes are assigned various type designations (such as LL, LB, LR, T, X, E and C) depending on the number and locations of these coupling hubs. Conduit box specifications including dimensions, interior volume and maximum numbers of conductors are set forth in Article 370 of the *National Electrical Code Hand Book*, Twenty-Fourth Edition.

Conduit boxes have bodies that form a separate portion of the conduit or tubing system. The inside of a conduit box is accessed through a removable cover. Large case or sheet metal boxes are not classified as conduit boxes. Conduit boxes cannot be concealed or buried underground. Under National Electrical Code, they must be either above ground or, if underground, must be accessible at all times. They can be installed indoors or outdoors and in damp locations, are dust proof and are coated inside and out to prevent corrosion.

Conduit box bodies may have threaded or non-threaded hubs or a combination of each. The oblong shape of some conduit junction boxes increase the ease of routing and pulling wire through the conduit junction box, which prevents damage to the wire's insulation by preventing the wire from sliding over sharp corners.

A common problem with conduit junction boxes installed outdoors is that they are subject to corrosion, which is accelerated by electrolysis. This is due to the fact that they are often exposed to adverse environmental conditions and electrical current. The result is that the removable cover and/or the attachment screws can corrode. When this occurs, it can be very difficult if not impossible to completely remove the attachment screws from the conduit junction box without damaging the conduit junction box's threaded holes. When corrosion damages or renders the threaded holes unusable, the conventionally designed removable cover can no longer be installed on the junction box and the junction box must be replaced. Replacing the entire junction box can be time consuming and costly, in part because all of the electrical connections inside the junction box must be rewired.

It would be highly desirable to provide an alternatively designed replacement cover that can be installed on new conduit junction boxes or on inservice conduit junction boxes with damaged or otherwise unusable threaded holes. The present invention obtains these results. For the replacement cover that comprises this invention, even if the screws corrode, removal and replacement may be performed without having to repair or replace the electrical junction box. Therefore, it becomes cheaper, easier and quicker to open, close and refit the conduit junction box with the new replacement cover.

SUMMARY OF THE INVENTION

Briefly, the present invention provides a conduit junction box replacement cover that can be installed on all types of conduit junction boxes without drilling, tapping, or otherwise modifying the conduit junction box, when the threaded holes used for the conventionally designed removable cover have been damaged and/or are unusable. The conduit junction box replacement cover will fit all types of conduit junction boxes, including but not limited to LL, LB, LR, T, X, E and C conduit junction boxes.

To this end, the replacement cover includes a body having an inside flat surface, outside flat surface, sides, ends and a rim. The rim protrudes from the perimeter of the inside flat surface. The rim has four distinct advantages. First, as designed, the rim will function to support the replacement cover on the conduit junction box. Second, the rim provides for the alignment of the replacement cover on the conduit junction box, facilitating the installation of the replacement cover. With this feature, the electrician need only place the replacement cover over the conduit junction box to align the replacement cover. Third, the rim centers support and align the sealing gasket. This also simplifies installation because the gasket need not be subsequently handled after it is placed within the rim. Finally, the rim provides a new surface through which the set screws can be threaded. The set screws are used to secure the replacement cover to the conduit junction box. To achieve this final advantage, the rim will extend to a length sufficient to permit the placement of up to several threaded holes on each of the two side surfaces and/or each of the two end surfaces of the rim. The axis of the threaded holes will be perpendicular to the sides or ends, respectively, of the conduit junction box replacement cover. Also, the rim will be designed to interface with all types of conduit junction boxes, including but not limited to LL, LB, LR, T, X, E and C type conduit junction boxes.

The rim can optionally contain preferably constant radius arcuate cut-outs on the sides and ends to avoid interference with the circular conduit hubs on the conduit junction boxes. This allows the conduit junction box replacement cover to be installed on any of the various configurations of conduit junction boxes, including the LL, LB, LR, T, X, E and C type conduit junction boxes which have various numbers and locations of conduit hubs. Set screws installed in the threaded holes of the conduit junction box replacement cover body securely fasten the conduit junction box replacement cover to the conduit junction box. The set screws could be cone-tipped, allowing them to bite into the soft electrical box body. This prevents the removable cover from sliding relative to the electrical junction box body, ensuring the compression of the sealing gasket and resulting in a watertight seal between the electrical box body, the sealing gasket and the conduit junction box replacement cover.

The sealing gasket is a thick, soft, rubber gasket which is self-aligning within the rim and the inside flat surface of the conduit junction box replacement cover. In the conventionally designed removable cover, a watertight seal was achieved by compressing the gasket between the electrical junction box body and removable cover by the force exerted by the tightening of the installation screws. For the conduit junction box replacement cover that is the subject of this patent application, a watertight seal is achieved by pressing the conduit junction box replacement cover firmly against the electrical box prior to tightening the replacement cover's set screws, thus compressing the soft gasket against the electrical box and replacement cover. Additionally, the length of the rim that overlaps the conduit junction box further improves the seal.

BRIEF DESCRIPTION OF THE SEVERAL VIEWS OF THE DRAWING

Other applications and features of the invention will become apparent from the following detailed description taken in connection with the accompanying drawings. It is to be understood, however, that the drawings are designed for the purpose of illustration only and are not intended as a definition of the limits of the invention.

FIG. 1 illustrates the prior art of the present invention.

FIG. 3 is a planar view of the replacement cover and the gasket shown in FIG. 2.

FIG. 4 is a section view of the replacement cover with the gasket seated therein taken along line 4-4 in FIG. 2.

DETAILED DESCRIPTION OF THE PREFERRED EMBODIMENTS

Figure 1:
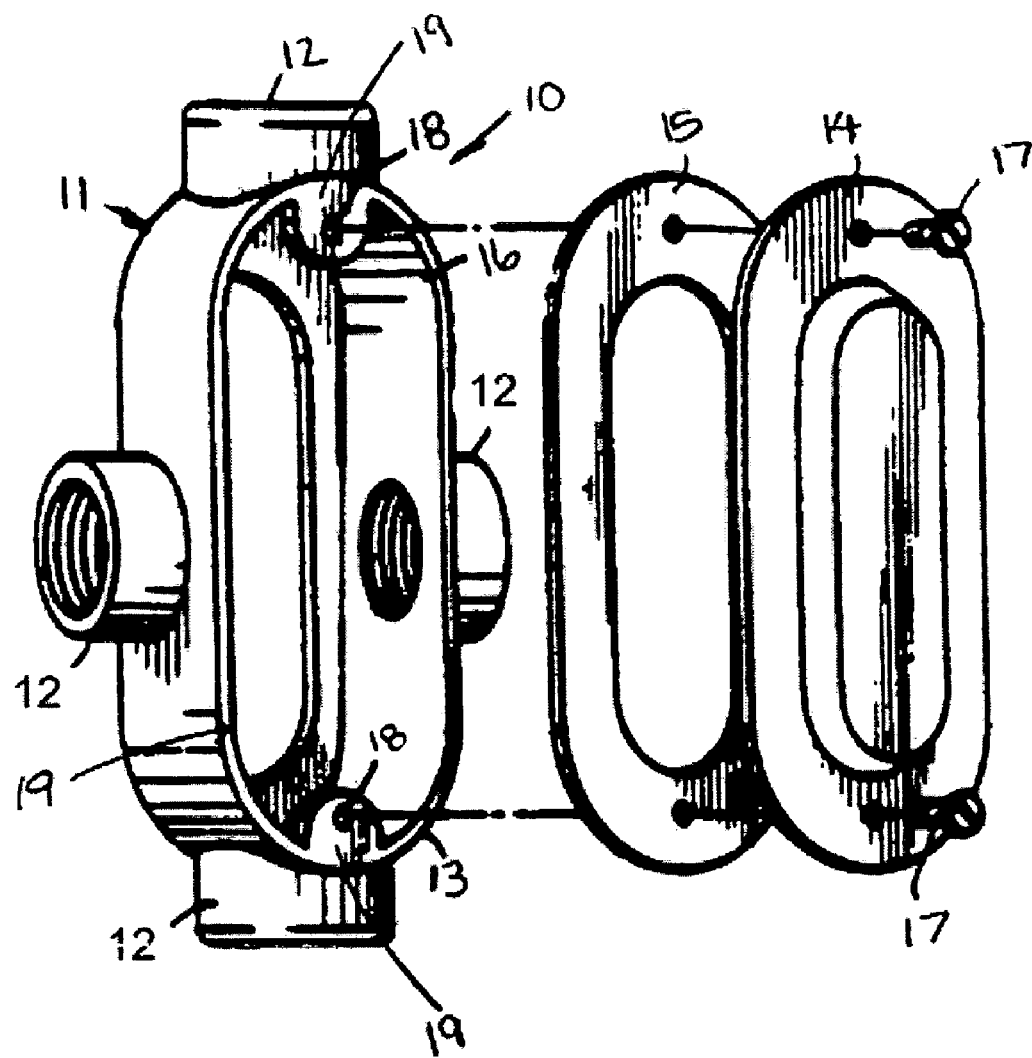
FIG. 1 is an exploded perspective view of a conduit junction box with the conventionally designed removable cover.

Referring now in detail to the drawings, FIG. 1 is an illustration of U.S. Pat. No. Re. 35,075—Extension For Electrical Junction Box, issued Oct. 31, 1995. This invention comprises an electrical junction box 10 with a hollow conduit body 11 and an open back 16 through which the interior of the box is accessible. The open back of the conduit junction box is closed with a removable cover 14. The bosses 13 allow attachment of the conduit junction box 11 to the removable cover 14. The removable cover 14 is secured to the conduit junction box 11 with tap screws 17 threaded in holes 18 of each boss 13. The removable cover 14 is sealed to surface 19 of the conduit junction box 11 by gasket 15.

Figure 2:
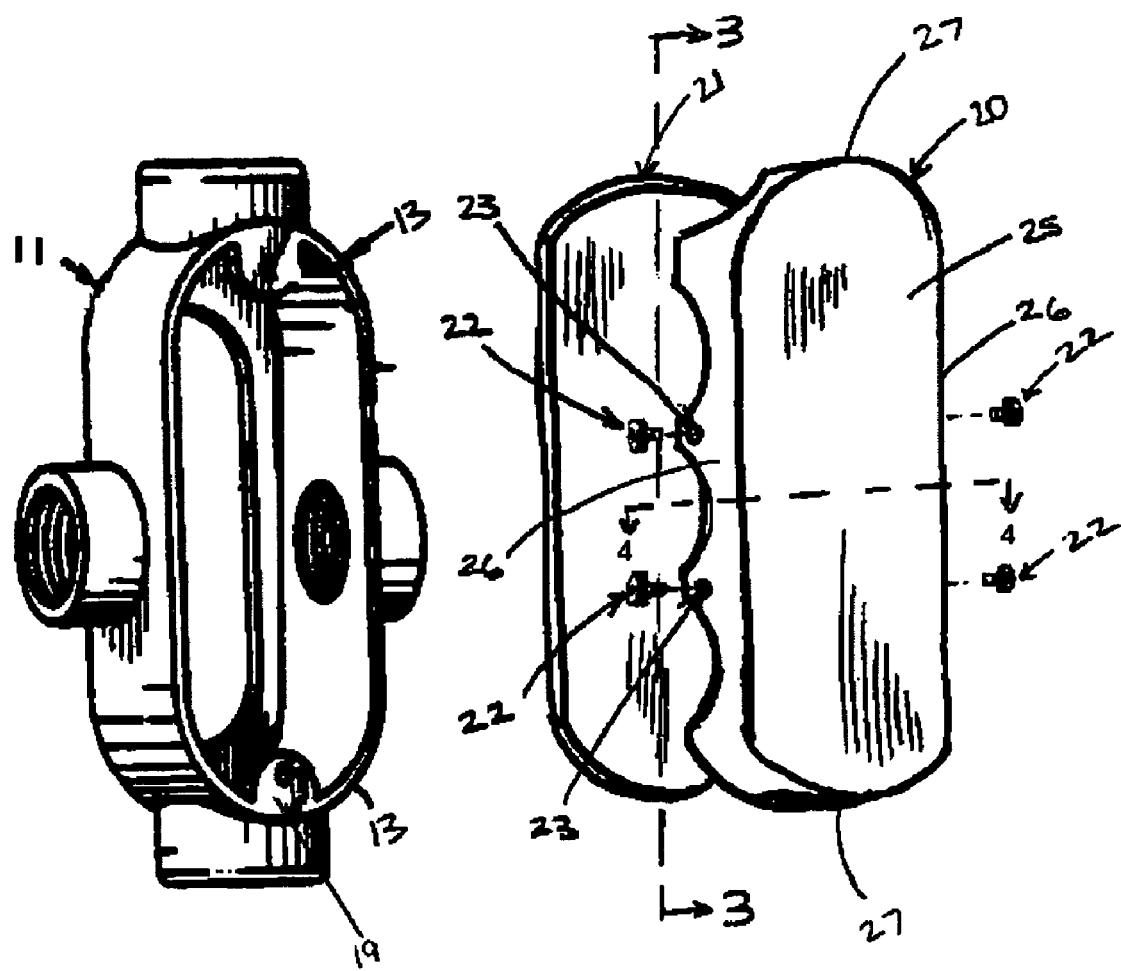
FIG. 2 is an exploded perspective view of a conduit junction box with the conduit junction box replacement cover.
Figure 5:
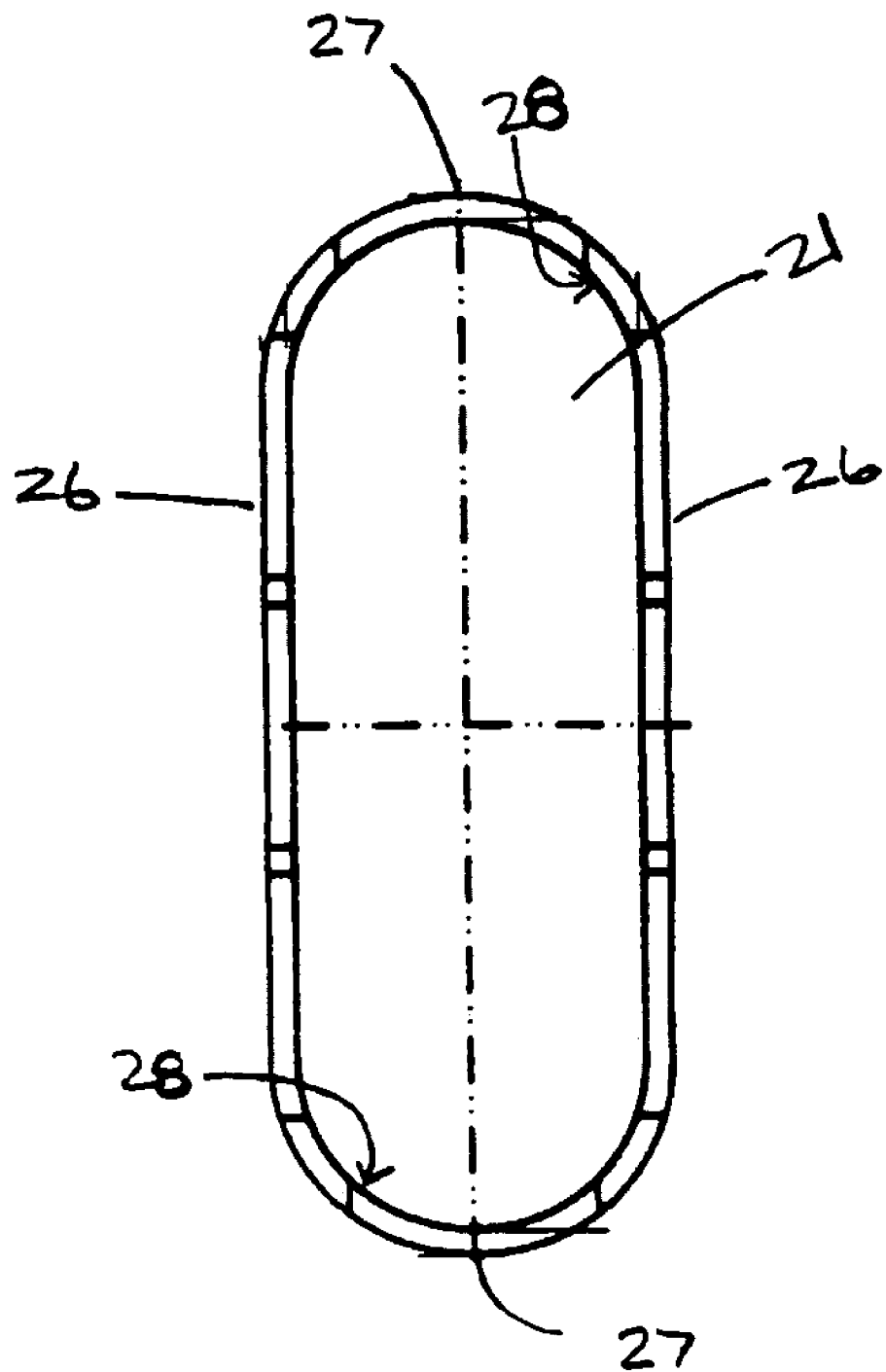
FIG. 5 is a planar view of the inside flat surface of the replacement cover without the gasket.

FIG. 2 illustrates the present invention—the Conduit Junction Box Replacement Cover, as it would be joined to a conventional conduit junction box. The present invention, the Conduit Junction Box Replacement Cover, consists essentially of conduit junction box replacement cover 20, gasket 21 and set screws 22.

Conduit junction box replacement cover 20 has an inside flat surface 24, outside surface 25, sides 26, ends 27 and rim 28. Rim 28 has a shape complementing or matching, but slightly oversized as compared to, the perimeter of the open side of the conduit junction box. The shape of the rim 28 allows the replacement cover 20 to be self-aligning to the external surfaces of the conduit junction box 11. The rim 28 protrudes from the perimeter of the inside flat surface 24 of the replacement cover 20. The conduit junction box replacement cover 20 can be manufactured in various configurations so that the rim 28 of the conduit junction box replacement cover 20 will fit each of the various configurations of conduit junction boxes, including but not limited to LL, LB, LR, T, X, E and C types. Each of the two sides 26 of the rim 28 can be designed to contain up to three optional cut-outs 29 to prevent interference between replacement cover 20 and coupling hubs 12. The coupling hubs 12 can be located in any of three positions along each side of the conduit junction box 11 and at the ends. Each of the two ends 27 of the rim 28 are also designed to contain an optional cut-out 29 to prevent interference between the replacement cover 20 and coupling hubs 12 that can be located on the ends of the conduit junction box 11. Based on currently designed conduit junction boxes, there may be eight total cut-outs on each replacement cover 20; perhaps more depending upon alternative design configurations of the conduit junction box hubs.

The gasket 21 is located adjacent to the inside flat surface 24 and is self-aligning within the rim 28. When installed, the gasket 21 abuts the surface or edges 19 of the hollow body 11 and the inside flat surface 24 of the replacement cover 20. The gasket 21 preferably consists of a thick, soft, rubber, sealing material that will be compressed with force applied to the replacement cover 20 during installation.

The replacement cover 20 and gasket 21 are joined to electrical junction box 10 using set screws 22 that are threaded through holes 23 in the sides 26 of the replacement cover 20. The set screws 22 must be tightened until firmly in contact with the sides of the electrical box. To ensure a watertight seal between the conduit junction box 11, the gasket 21 and the conduit junction box replacement cover 20, the replacement cover 20 must be positioned firmly against the electrical box prior to tightening the set screws 22. This method of joining the replacement cover 20 to the electrical box 10 does not require the existence of threaded holes in the electrical box.

Using the set screws has the advantage over the prior art devices that, should conditions exist that cause corrosion, the set screws can be drilled out to remove the replacement cover. No injury to the conduit box occurs. And if the corrosion affects the replacement cover, another may be easily and economically fitted without rewiring the junction box.

Although the present invention has been described by way of exemplary embodiments, it should be understood that many changes and substitutions may be made by those skilled in the art without departing from the spirit and the scope of the present invention, which is defined by the appended claims.

What is claimed is:

1. A replacement cover for an electrical conduit junction box of the type having a generally rectangular configuration, at least one open side and at least one cylindrical conduit hub projecting outwardly from the junction box, said replacement cover being adapted to be secured to the junction box for sealably closing the open side thereof, said cover being generally planar, having substantially the same geometrical configuration as the open side of the electrical conduit junction box, and defining a rim portion extending about the periphery of said cover and projecting normally therefrom so as to depend over portions of the junction box adjacent to the open side thereof, said rim portion defining at least one cut-out area, said cut-out being shaped to conform to the configuration of an exterior portion of a single projecting conduit hub, and including a plurality of fasteners projecting through the depending portion of the rim of said cover for affixing said cover to the junction box, whereby upon said cover being disposed over and pressed against an open side of the junction box a sealed securement can be provided over the open side of the junction box unobstructed by an outwardly extending conduit hub thereon.

2. The replacement cover of claim 1 wherein said rim portion defines at least two cut-out areas that are each shaped to conform to the configuration of an exterior portion of a single projecting conduit hub.

3. The replacement cover of claim 2 wherein said fasteners comprise set screws that are not threaded into pre-existing openings defined in the junction box.

4. The replacement cover of claim 2 wherein the depending portion of the rim has a plurality of through-holes, each of said holes being threaded, said fasteners being threadedly engaged in said holes.

5. The replacement cover of claim 1 or 4 wherein the fasteners are positioned to firmly engage the outer side of a junction box and not be threaded into pre-existing openings defined in the junction box.

6. The replacement cover of claim 5 wherein said fasteners comprise set screws.

7. The replacement cover of claim 2 wherein the cover is for an electrical conduit junction box of the type having a single open side, and the generally planar cover is configured to close said single open side.

8. A method of replacing a cover for an electrical conduit junction box, the method comprising the steps of:
   providing an electrical conduit junction box having at least one open side and a first cover that is secured to the junction box by fasteners that are threaded into a first set of openings,
   removing the first cover from the junction box,
   providing a second cover, the second cover being generally planar, and defining a rim portion extending about at least a portion of the periphery of the cover and projecting normally therefrom, wherein the rim portion includes a plurality of holes defined therein,
   placing the second cover over the open side of the electrical conduit junction box such that the rim portion depends over portions of the junction box adjacent to the open side thereof, and
   inserting fasteners through the plurality of holes in the rim portion and securing the fasteners to the sides of the electrical conduit junction box, wherein the fasteners firmly engage the sides of the electrical conduit junction box and are not threaded into any of the first set of openings.

9. The method of claim 8 wherein during the step of removing the first cover from the junction box at least one of the first set of openings is damaged so a fastener cannot be threaded therein.

10. In an electrical conduit junction box, which junction box comprises a generally rectangular configuration, at least one open side, at least one cylindrical conduit hub projecting outwardly from a side thereof, and at least one boss having an opening defined therein extending inwardly from a side thereof,
   the improvement comprising a replacement cover that is generally planar and defines a rim portion extending about at least a portion of the periphery thereof that projects normally therefrom so as to depend over portions of the junction box adjacent to the open side thereof, wherein the depending rim portion has a plurality of threaded openings defined therein, and wherein fasteners are threaded into the threaded openings in the depending rim portion to attach the replacement cover to the electrical conduit junction box, wherein the fasteners firmly engage the outer side of the junction box and are not threaded into pre-existing openings defined in the junction box.

11. In an electrical conduit junction box, which junction box comprises a generally rectangular configuration, at least one open side, at least one cylindrical conduit hub projecting outwardly from a side thereof, at least one boss having an opening defined therein extending inwardly from a side thereof, and a cover plate threadably attached to the at least one boss,
   the improvement comprising a replacement cover that is generally planar and defines a rim portion extending about at least a portion of the periphery thereof that projects normally therefrom so as to depend over portions of the junction box adjacent to the open side thereof, wherein the depending rim portion has a plurality of threaded openings defined therein, and wherein fasteners are threaded into the threaded openings in the depending rim portion to attach the replacement cover to the electrical conduit junction box, wherein the fasteners abut the outer side of the junction box and are not threaded into pre-existing openings defined in the junction box.

12. The improvement in an electrical conduit junction box of claims 10 or 11 wherein the junction box includes damaged threaded openings that previously received fasteners for securing a cover on the junction box.

13. A method of replacing a cover for an electrical conduit junction box of the type having at least one open side and a removable cover that includes openings in the top thereof for securing the cover to the box, the method comprising the steps of:
   removing the removable cover from the electrical conduit junction box,
   providing a replacement cover, the replacement cover being generally planar, and defining a rim portion extending about at least a portion of the periphery of the cover and projecting normally therefrom so as to depend over portions of the junction box adjacent to the open side thereof,
   placing the replacement cover over the open side of the electrical conduit junction box, and
   securing the replacement cover to the electrical conduit junction box
   wherein the step of securing the replacement cover to the electrical conduit junction box does not include threading fasteners into the openings in the top of the junction box.

14. The method of claim 13 wherein the replacement cover further comprises a plurality of holes defined in the depending rim portion, and wherein the step of securing the replacement cover to the electrical conduit junction box includes inserting fasteners through the plurality of openings and securing the fasteners to the sides of the electrical conduit junction box, wherein the fasteners abut the sides of the electrical conduit junction box and are not threaded into any pre-existing openings defined therein.

15. The method of claim 14 wherein the fasteners comprise set screws.

16. The method of claim 13 wherein the replacement cover has substantially the same geometrical configuration as the open side of the electrical conduit junction box.

17. The method of claim 13 wherein the electrical conduit junction box does not include a protruding pin for twistingly securing the replacement cover to the box.

18. An electrical conduit junction box in combination with a replacement cover, the junction box having a generally rectangular configuration, at least one open side, at least one cylindrical conduit hub projecting outwardly from a side thereof, at least one boss having an opening defined therein extending inwardly from a side thereof, and at least one opening defined therein for securing a cover thereto, the replacement cover being generally planar and defining a rim portion extending about at least a portion of the periphery thereof that projects normally therefrom so as to depend over portions of the junction box adjacent to the open side thereof, the depending rim portion having a plurality of threaded openings defined therein, and wherein fasteners are threaded into the threaded openings in the depending rim portion and firmly engage the side of the electrical conduit junction box, but are not threaded into the at least one opening defined therein for securing a cover thereto.

* * * * *